United States Patent [19]

Ryder

[11] Patent Number: 4,753,560
[45] Date of Patent: Jun. 28, 1988

[54] FASTENER-CARRIER SYSTEM

[75] Inventor: Francis E. Ryder, Arab, Ala.

[73] Assignees: Ryder International Corporation, Arab, Ala.; Textron Inc., Providence, R.I.; a part interest

[21] Appl. No.: 796,092

[22] Filed: Nov. 7, 1985

[51] Int. Cl.⁴ .................. F16B 31/02; F16B 39/02; F16B 37/14
[52] U.S. Cl. ............................. 411/82; 411/3; 411/377; 411/393; 411/45; 52/511
[58] Field of Search .............. 411/82, 84, 85, 107, 411/258, 369, 377, 908, 3, 393, 410, 7, 45; 52/511

[56] References Cited

U.S. PATENT DOCUMENTS

| | | | |
|---|---|---|---|
| 1,867,354 | 7/1932 | Dickson | 411/377 |
| 2,099,990 | 11/1937 | Rosenberg | 411/377 |
| 2,341,829 | 2/1944 | Tinnerman | 411/84 |
| 3,153,975 | 10/1964 | Rapata | 411/45 |
| 3,584,667 | 6/1971 | Reiland | 411/7 X |
| 3,897,712 | 8/1975 | Black | 411/373 |
| 4,472,098 | 9/1984 | Kiefer | 411/369 |
| 4,492,500 | 1/1985 | Ewing | 411/393 X |
| 4,544,312 | 10/1985 | Stencel | 411/3 |

FOREIGN PATENT DOCUMENTS 47-43388 2/1972 Japan ................... 411/377
1408532 10/1975 United Kingdom ........... 411/377

Primary Examiner—David A. Scherbel
Assistant Examiner—Richard E. Chilcot, Jr.
Attorney, Agent, or Firm—Trexler, Bushnell, Giangiorgi & Blackstone, Ltd.

[57] ABSTRACT

A fastener-carrier system comprises at least one metallic threaded fastener member including a head portion, a tip portion and an externally threaded shank portion intermediate the head and tip portions and defining an axis. A carrier strip comprises a substantially flat, elongate member of a moldable material and the fastener head portion is moldably embedded into the carrier strip with the tip and threaded shank portions projecting outwardly of the carrier strip. The carrier strip includes a substantially flat workpiece-engaging surface, with the fastener extending outwardly thereof for extending into a receiving aperture in a facing workpiece surface. A raised, elastically deformable skirt portion is provided on the workpiece-engaging surface surrounding each fastener for positively engaging the workpiece surface and for deforming sufficiently thereagainst to form a seal completely around an otherwise exposed portion of the fastener at the workpiece-engaging surface.

10 Claims, 1 Drawing Sheet

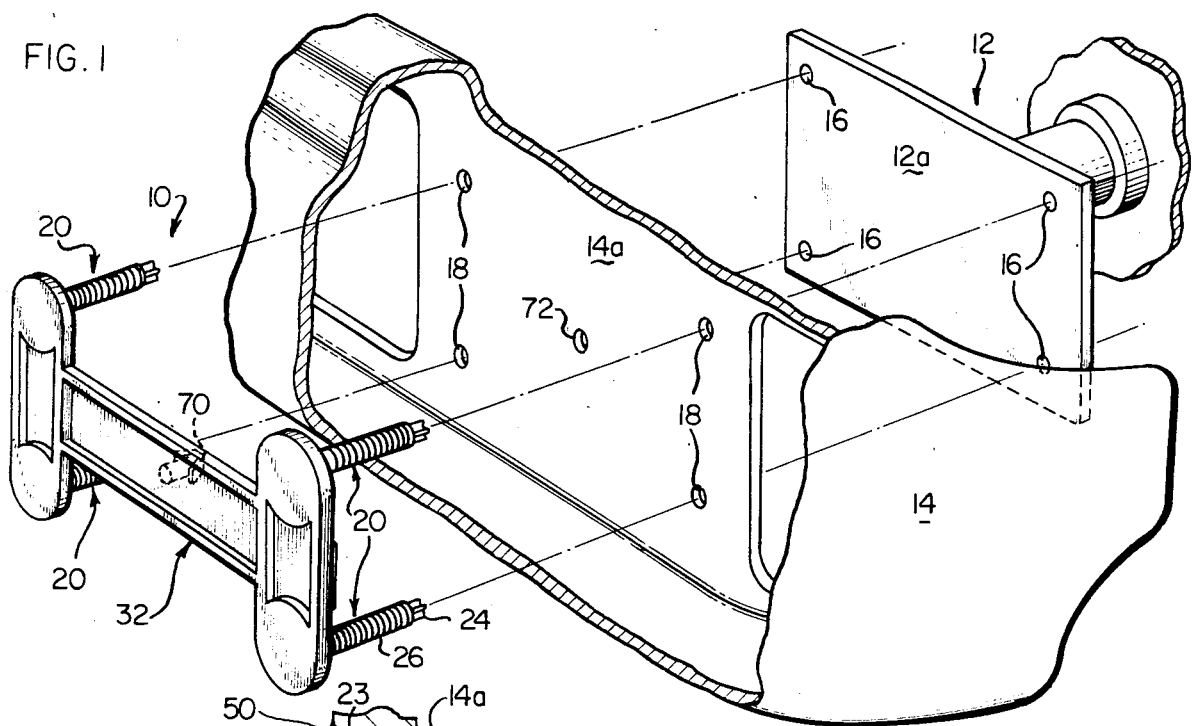
FIG. 1
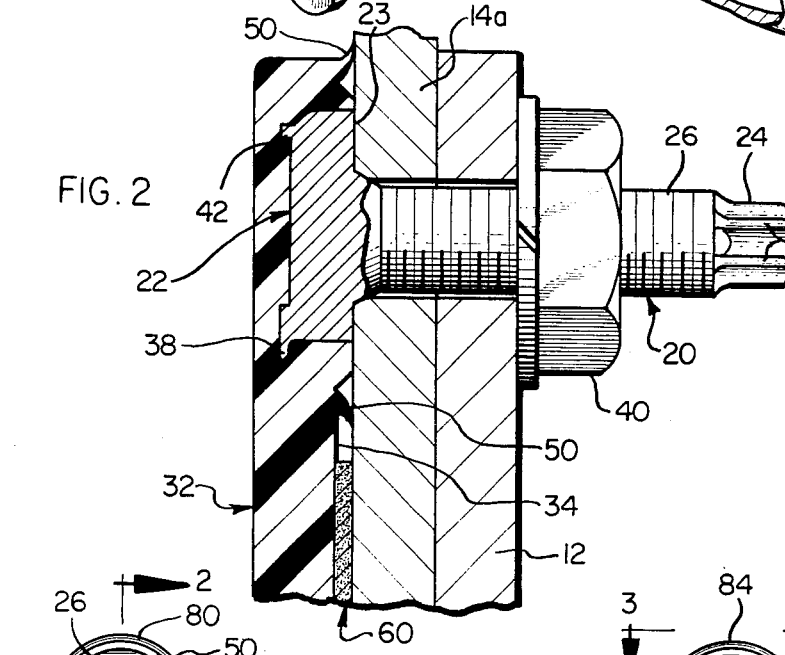
FIG. 2
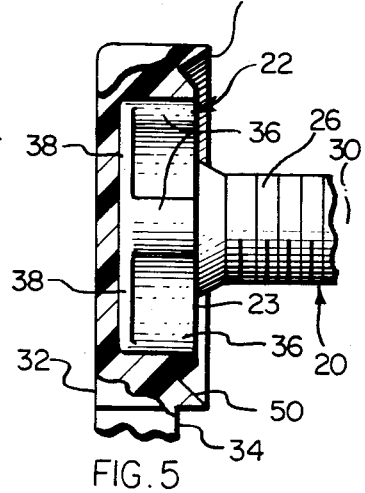
FIG. 3
FIG. 5
FIG. 4
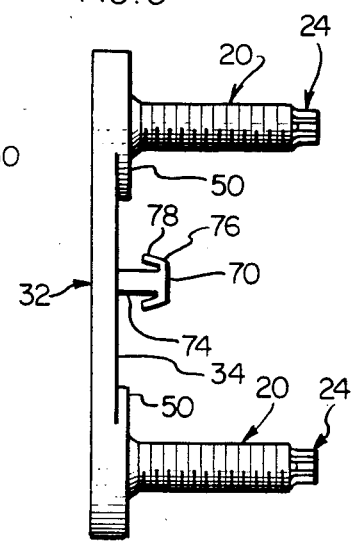

FASTENER-CARRIER SYSTEM

BACKGROUND OF THE INVENTION

The present invention is directed generally to the fastener arts and more particularly to a novel fastener-carrier system including a carrier strip and one or more fasteners for use in coupling together a pair of workpieces, for example.

The fastener-carrier system of the invention is particularly adapted for use in joining a pair of workpieces at abutting, substantially flat surface portions thereof. Such a fastener-carrier system is particularly useful, for example, in the automotive industry for joining panels to underlying support structures wherein access to the side of one of panels for deployment of a work took is difficult.

More specifically, such a fastener-carrier system may be utilized to affix a bumper to a mounting plate portion of a shock absorbing structure, of the type often utilized in impact-resistant bumper assemblies. In such applications, it should be recognized that a shank portion of the fastener must generally project through the bumper or other first workpiece so as to engage with a complementary aperture on the mounting plate or other second workpiece or underlying support member. As can be appreciated from the illustration of FIG. 1 the interior of the bumper does not provide adequate space for employment of tooling to hold the fastener in place. With the present invention the carrier system serves to maintain the fasteners in place and permit ease in joining the bumper to the mounting plate. Thereafter, the fastener may be used to secure the two workpieces together, in the case where a threaded fastener is used, by engaging a complementary internal threaded nut-type fastener therewith and advancing the complementary fastener to grip the two workpieces tightly together.

It will be recognized from FIG. 1 that it is difficult and time consuming for the worker or assembler to perform such an assembly with conventional threaded fasteners. The assembler must first locate and insert the fastener(s) through one or more apertures in the first workpiece, and then engage the fastener with some form of tool to hold the fastener(s) in place while locating the aperture or apertures of the second workpiece. The whole assembly must then be held in place while starting the complementary fastener(s). The assembler must also hold each first fastener against rotation while starting and driving the mating fastener to assure the desired torque upon the second or mating fastener with respect thereto and the desired degree of gripping of the workpieces therebetween. In this regard, it will be recognized that an intermediate mating fastener cannot be utilized to initially position and hold the first fastener in place when the two workpieces are to be held in abutting relationship.

The prior art has proposed utilizing studs welded directly to one of the workpieces to solve the foregoing problems. However, this requires that the weld be substantially clean and flush with the surface, thereby requiring additional grinding or smoothing steps, to assure the desired flat and abutting condition of the two workpieces. Moreover, the welded stud has very little corrosion resistance in the area of its coupling or welding to the first or underlying workpiece. In automotive assemblies, it will be recognized that these structures are constantly exposed to potentially corrosive environmental conditions. Hence, the prior art system may fail due to corrosion of the critical welded areas of the stud.

Moreover, the weld must withstand a substantial amount of torque applied by the tool which applies the mating fastener or nut to the threaded shank of the stud. The axial force created as the mating fastener seats must also be accommodated by the weld. Failure and/or breakage of the stud relative to its mounting surface either during assembly or afterward due to stresses encountered during assembly is to be avoided.

OBJECTS AND SUMMARY OF THE INVENTION

Accordingly, it is a general object of the invention to provide a novel and improved fastener for joining a pair of workpieces in abutting condition.

A more specific object is to provide a fastener-carrier system in accordance with the foregoing object which substantially avoids the above-noted problems.

A related object is to provide a fastener-carrier system in accordance with the foregoing objects which is relatively simple and inexpensive in its design and manufacture and yet highly reliable in operation.

Briefly, and in accordance with the foregoing objects, a fastener-carrier system in accordance with the invention comprises at least one metallic threaded fastener member including a head portion, a tip portion and an externally threaded shank portion intermediate the head and tip portions and defining an axis. A carrier strip comprises a substantially flat, elongate member of a moldable material and the fastener head portion is moldably embedded into the carrier strip with the tip and threaded shank portions projecting outwardly of the carrier strip. The carrier strip includes a substantially flat workpiece-engaging surface, with the fastener extending outwardly thereof for extending into a receiving aperture in a facing workpiece surface. A raised, elastically deformable skirt portion is provided on the workpiece-engaging surface surrounding each fastener for positively engaging the workpiece surface and for deforming sufficiently thereagainst to form a seal completely around an otherwise exposed portion of the fastener at the workpiece-engaging surface.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings, in which like reference numerals identify like elements, and in which:

FIG. 1 is a perspective view of one form of a fastener-carrier system according to the invention, together with a portion of an automobile bumper and a support member therefor to be joined by the system of the invention;

FIG. 2 is an enlarged partial sectional view of another form of a fastener-carrier system in accordance with the invention taken generally along the line 2—2 on FIG. 4, together with a pair of workpieces being joined thereby;

FIG. 3 is an enlarged patially broken-away view taken along the line 3—3 of FIG. 4.

FIG. 4 is a bottom plan view of the fastener-carrier system of FIG. 2; and

FIG. 5 is an end view of the fastener carrier system of FIG. 1.

DETAILED DESCRIPTION OF THE ILLUSTRATED EMBODIMENT

Referring now to the drawings, and initially to FIG. 1, a fastener-carrier system in accordance with the invention is designated generally by the reference numeral 10. In FIG. 1, the fastener-carrier system 10 is shown joining a pair of workpieces 12, 14. In the illustrated embodiment, the workpiece 12 comprises a mounting plate portion of an automobile bumper shock absorbing assembly and the workpiece 14 comprises a portion of the automobile bumper. In this regard, both workpieces 12 and 14 have relatively thin, substantially flat portions 12a, 14a to be joined in abutting condition by the fastener-carrier system 10 of the invention. That is, the fastener-carrier system 10 is to join the two workpieces 12, 14 together in substantially flat, surface-to-surface abutting condition. The respective workpieces 12 and 14 are also provided with respective pairs of alignable through apertures 16, 18 for receiving portions of the fastener-carrier system or assembly 10 therethrough as will presently be seen.

Referring also to FIGS. 2-5, the fastener-carrier system 10 comprises at least one externally threaded fastener 20. Preferably fastener 20 comprises a metallic threaded fastener including a head portion 22, a leading tip portion 24, and an externally threaded shank portion 26 intermediate the head 22 and tip 24. This threaded shank portion 26 preferably has a major thread diameter much smaller than the outer diameter of the head portion 22 but larger than the outer diameter or maximum cross-sectional dimension of tip portion 24. Moreover, the shank 26 defines an axis generally perpendicular to the head 22, as generally indicated by phantom line 30 in FIG. 3.

The fastener-carrier system 10 also includes a carrier portion comprising a substantially flat, elongate carrier strip or member 32, formed of a moldable material. In accordance with the invention, the fastener head portion 22 is molded into or moldably embedded within the carrier strip 32, such that the tip 24 and threaded shank 26 project outwardly of the carrier strip 32. As best viewed in FIG. 3, the axis 30 of shank 26 extends generally normally or at right angles to a substantially flat undersurface 34 of the carrier strip 32.

The fastener head portion 22 will be seen to include a first radially projecting means comprising a lobular pattern defined by a plurality of radially extending lobes or undulating surfaces 36 which serve substantially to resist rotational movement of the fastener 20 relative to the carrier strip 32 once embedded therein. In this regard, during the molding or formation of the carrier strip about the head 22, it will be seen that the material of the carrier strip will tend to flow about these lobes 36. This forms a relatively secure mechanical interlock between the carrier strip and the head for resisting relative rotation between the fastener 20 and carrier strip 32. Moreover, a second radially projecting means, taking the form of a web portion comprising web-like members 38 extending between the lobes 36 is provided on the head 22. This latter means or web 38 is for resisting axial movement, that is, in the direction of axis 30, of the fastener 20 relative to the carrier strip 32. In the illustrated embodiment, the web 38 is formed at a topmost portion of the fastener head 22 and comprises a relatively thin layer or portion of the material thereof.

It will be recognized that the resistance to both radial and axial movement provided by the foregoing structure of the head 22 is helpful in accommodating forces applied to the fastener 20, for example, when a mating fastener such as internally threaded fastener or nut 40 is being applied thereto as illustrated in FIG. 2. In accordance with the embodiment illustrated, and for further resisting rotational movement between the head 22 and carrier strip 32, an additional recess 42 is formed in an uppermost portion of the head 22. Preferably recess 42 defines a generally undulating or lobular surface, which is preferably substantially geometrically similar to and centered with respect to the lobes or lobular pattern 36 previously described.

For additionally preventing such relative rotation or stripping of the head 22 from carrier strip 32 during removal or application of nut 40, an additional tool-receiving surface or means 44 is formed on the tip 24. In the illustrated embodiment this tool-receiving means or surface 44 takes the form of an undulating, radially projecting series of surfaces or lobes of substantially similar form to the lobes or radially projecting, undulating surfaces 36 previously described. The tool-receiving means or lobes 44 may receive a complementary tool to hold the fastener against rotation during application of the mating internally threaded fastener or nut 40 to the threaded shank portion 26. In this regard, a power tool may be utilized to apply mating fastener 40 and may impart substantial torsional forces thereto. Hence, the above-described structure is most advantageous in assuring that such forces, as well as the axial force along shank 26 experienced upon tightening of fastener 40, will not dislodge the fastener 20 from the carrier strip 32.

Preferably, the lobes or lobular configurations of the radially projecting means 36, of the recess 42 and of the tool-receiving portion 44 all comprise a multi-lobular and preferably hex-lobular configuration of the type shown and described in U.S. Pat. No. 3,584,667, to which reference is invited. Moreover, while the web portion 38 extends intermediate each of the lobes 36 of the multi-lobular driver head portion 36, it will be understood that such a web portion 38 may extend only intermediate selected ones of the lobes 36 without departing from the invention.

In accordance with the invention, a raised, elastically deformable skirt member or portion 50 is formed on the flat undersurface 34 of the carrier strip 32 about each fastener 20. Preferably, the skirt is integrally formed or molded with the formation of carrier strip 32, and this same molding process also fixes or embeds the head of each fastener 20. This raised skirt portion is substantially circular or annular in form and surrounds each of the fasteners 20 and completely inscribes the head 22. More particularly, the skirt 50 preferably defines a diameter greater than the maximum diameter of the head portion 22 of each fastener 20 and completely surrounds this head portion, somewhat radially outwardly thereof. This skirt 50 is provided to assure sealing of the fastener 20 and particularly the exposed undersurface of the head portion and the connected end of the shank portion at the facing surface 14a of the workpiece 14.

In this latter regard, each raised, elastically deformable skirt 50 is arranged for positively engaging the workpiece surface 14a to effect such a seal. As best viewed in FIG. 2, the raised skirt 50, upon advancement of mating fastener 40 for tightening of the fastener-carrier assembly relative to workpiece 14, deforms sufficiently against surface 14a to form a seal completely around an otherwise exposed portion of the fastener at the flat undersurface 34. This latter surface 34 may also be referred to as the workpiece-engaging surface.

As can be noted from FIGS. 2 and 3, the undersurface 23 of the head 22 of each fastener 20 is exposed. This has been done so that a metal-to-metal clamping action can be attained. However, due to the possible dissimilarity between the metals of the fastener 20 and the bumper section 14 and the possibility of galvanic corrosion, it is important that this interface be sealed against moisture. As can be appreciated from the above discussion the skirt or lip 50 will provide a moisture resistant seal in the area of surface-to-surface engagement of the fastener 20 and bumper 14.

In accordance with a further feature of the invention, novel gripping means are further provided on the workpiece-engaging surface 34 for holding the carrier strip 32 in position on the workpiece surface 14a during installation of the mating fastener 40 on each fastener 20. This obviates the need for a worker to physically hold the carrier strip in place, following inital placement thereof and insertion of fastener shanks 26 through the receiving apertures 18 and 16 in the respective workpieces 12 and 14.

In accordance with one form of the invention and referring to FIG. 4, this gripping means comprises an adhesive means or member 60 overlying the workpiece-engaging surface 34. More particularly, this adhesive means or member preferably comprises a double adhesive-sided tape member or strip 62 having an additional peelable, removable cover strip or protective cover 64 thereover for removal immediately prior to engagement with the workpiece 14. As also partially illustrated in FIG. 2, this adhesive member 60, and more particularly the double-sided adhesive tape or strip 62, engages workpiece surface 14a during installation of the fastener-carrier 10 of the invention.

In accordance with an alternate form of the invention, as best viewed in FIG. 5, the gripping means may alternatively comprise a snap-like fastener member 70 formed integrally with the carrier strip 32 and extending outwardly from the workpiece-engaging surface 34. This snap-like fastener member 70 is engaged in mating through aperture 72, provided in the workpiece 14 therefor. In the illustrated embodiment, the fastener member 70 will be seen to include a central shaft portion 74 and an enlarged head portion 76, preferably having rearwardly diverging barbs 78 for positively engaging behind the through aperture 72 to hold the fastener-carrier member in place on the workpiece surface 14a.

In accordance with the illustrated embodiment, the carrier strip 32 comprises an I-shaped member, as best viewed in FIGS. 1 and 4. This I-shaped fastener carrier includes four substantially identical ones of the fasteners 20 symmetrically disposed adjacent the respective outer corners 80, 82, 84 and 86 thereof. That is, the fasteners 20 will be seen in FIG. 4 to be located symmetrically at the outer ends of each of the bar portions 32a and 32b of the I-shaped carrier member 32.

Preferably, the adhesive tape gripping means 60 of the embodiment of FIG. 4 is substantially centrally disposed along the main body or base or central portion of 32c of the carrier strip 32. That is, the adhesive member 60 extends substantially over the entire length of portion 32c of the I-shaped of the carrier strip 32 which joins the respective end members 32a and 32b which mount the fasteners 20. Moreover as illustrated, the adhesive member 60 preferably extends over the central portions of these cross bars 32a and 32b and substantially symmetrically intermediate the respective fasteners 20 mounted to either side thereof.

The fastener member or snap 70 in the embodiment of FIG. 5 is preferably substantially centrally located with respect to the symmetry of the I-shaped carrier strip 32. That is, the fastener member 70 is substantially centered with respect to the carrier strip central or base portion 32c and indicated in phanton line in FIG. 1. Alternately, one of the illustrated fasteners 20 may be replaced by a snap-like fastener member similar to member 70.

While particular embodiments of the invention have been shown and described in detail, it will be obvious to those skilled in the art that changes and modifications of the present invention may be made without departing from the invention in it broader aspects, some of which changes and modifications being matters of routine engineering or design, and others being apparent only after study. As such, the scope of the invention sould not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A fastener-carrier system comprising: an elongate carrier strip comprised of a substantially flat elongate member of a moldable material, said elongate member being I-shaped and having respective corners; a fastner member carried proximate the respective corners of said I-shaped member, each fastener member including a head portion and an externally threaded shank portion, each said fastener member head portion being embedded in said carrier strip with the threaded shank portion thereof projecting outwardly from said carrier strip and each of said shank portions project in the same direction, the undersurface of the head of each said fastener member being exposed for clamping engagement with a workpiece, and said elongate member of moldable material comprising said carrier strip including an annular, raised elastically deformable skirt portion disposed radially outward of and surrounding each of the exposed undersurfaces of the fastener heads embedded therein, each said skirt portion being adapted to sealingly engage a workpiece upon said fasteners being drawn into clamped engagement which will produce deformation of said skirt portions, and means on said elongate member intermediate the corners thereof for holding said carrier strip in position on a workpiece preparatory to installation of a mating fastener member upon the externally threaded shank portions of said embedded fastener members.

2. A fastener-carrier system according to claim 1, wherein said means for holding said carrier strip in position comprises a strip of adhesive tape having a peelable cover strip thereover for removal immediately prior to engagement of the fastener-carrier strip with a workpiece.

3. A fastener-carrier strip according to claim 1, wherein said means for holding said carrier strip in position comprises a snap-fastener member formed integral with and extending outwardly from the intermediate portion of said elongate member for engagement with an appropriately sized aperture in said workpiece.

4. A system according to claim 1 wherein said fastener head portion includes first radially projecting means for resisting rotational movement relative to said carrier strip and second radially projecting means for resisting axial movement relative to said carrier strip.

5. A system according to claim 4 wherein said first radially projecting means defines a multi-lobular driver head-like portion having a plurality of lobes of predetermined configuration.

6. A system according to claim 5 wherein said second radially projecting portion defines web-like members intermediate at least selected ones of the lobes of said driver head portion.

7. A fastener-carrier system, comprising: an elongate carrier strip comprised of a substantially flat elongate member of a moldable material and having respective ends; at least one fastener member carried proximate the respective ends of said carrier strip, each fastener member including a head portion and an externally threaded shank portion, the head portions of said fastener members being embedded in said carrier strip with the threaded shank portion of each said fastener member projecting outwardly from said carrier strip in the same direction, the undersurface of the head portions of each said fastener member being exposed for clamping engagement with a workpiece, and said elongate member of moldable material comprising said carrier strip including an annular, raised, elastically deformable skirt portion disposed radially outward of and in surrounding position with respect to each of the exposed undersurfaces of the fastener member head portions embedded in said strip, said skirt portions sealingly engaging a workpiece upon said fasteners being drawn into clamped engagement which will produce deformation of said skirt portions, and means on said elongate carrier strip member for engaging the workpiece and holding said carrier strip in position preparatory to the installation of mating fasteners upon the externally threaded shank portion of said fastener members.

8. A carrier system according to claim 7, wherein said means for holding carrier strip in position on said workpiece comprises adhesive means having a peelable cover strip thereover for removal immediately prior to engagement of said carrier strip with a workpiece.

9. A carrier strip according to claim 7, wherein said means for holding said carrier strip in position with respect to said workpiece comprises a snap-fastener member formed integrally with and extending outwardly from said elongate member for engagement with a mating through aperture in said workpiece.

10. A fastener-carrier system, comprising: an elongate carrier strip comprised of a substantially flat elongate member of a moldable material; at least one fastener member carried proximate the respective ends of said carrier strip, each fastener member including a head portion and an externally threaded shank portion, the head portions of said fastener members being embedded in said carrier strip with the threaded shank portion of each said fastener member projecting outwardly from said carrier strip in the same direction, the undersurface of the head portions of each said fastener member being exposed for clamping engagement with a workpiece, and said elongate member of moldable material comprising said carrier strip including an annular, raised, elastically deformable skirt portion disposed radially outward of and in surrounding position with respect to each of the exposed undersurfaces of the fastener member head portions embedded in said strip, said skirt portions sealingly engaging a workpiece upon said fasteners being drawn into clamped engagement which will produced deformation of said skirt portions.

* * * * *